J. A. HOCKER.
AUTOMOBILE WHEEL.
APPLICATION FILED AUG. 10, 1921.
1,431,660.
Patented Oct. 10, 1922.
2 SHEETS—SHEET 1.
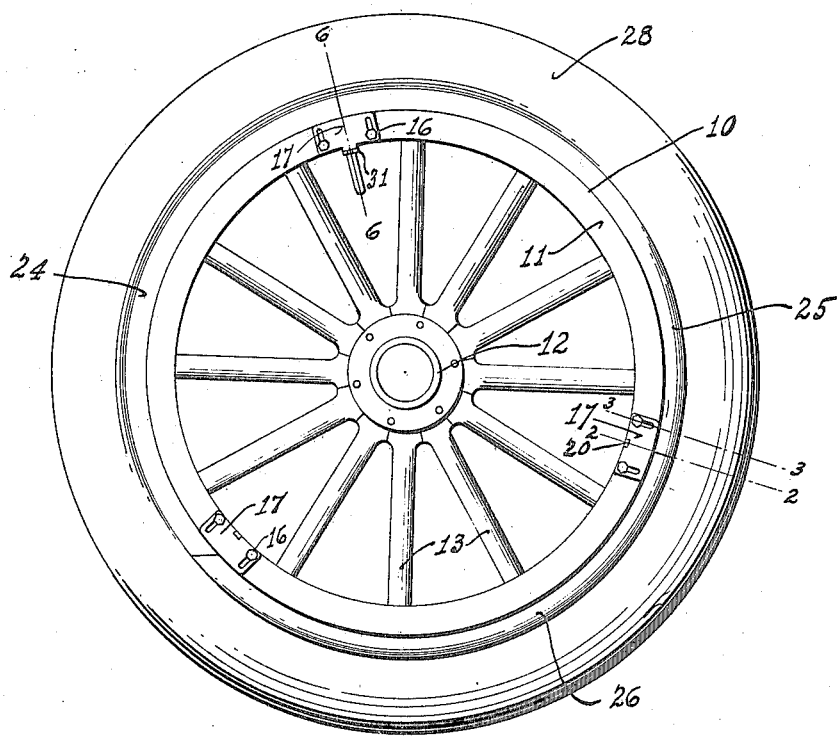
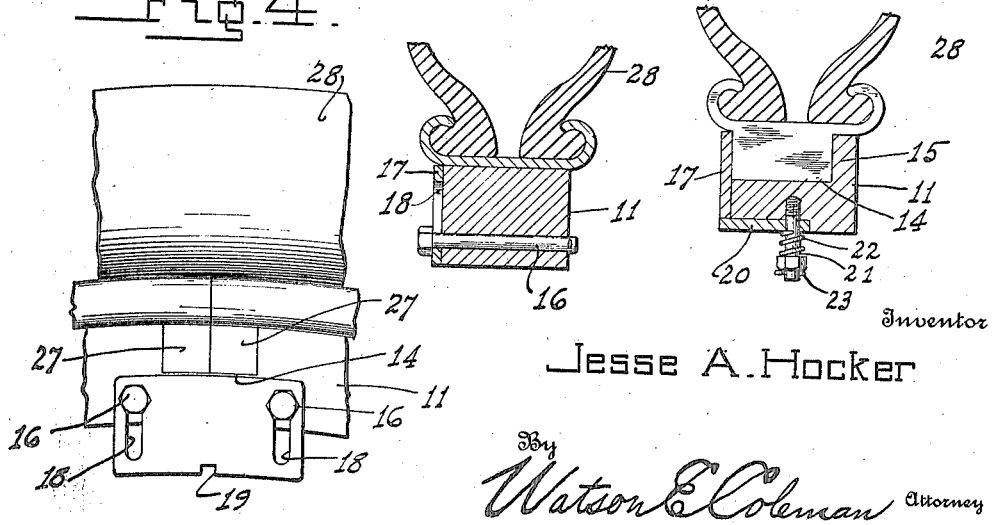
Inventor
Jesse A. Hocker
By
Watson E. Coleman Attorney J. A. HOCKER.
AUTOMOBILE WHEEL.
APPLICATION FILED AUG. 10, 1921.
1,431,660.
Patented Oct. 10, 1922.
2 SHEETS—SHEET 2.
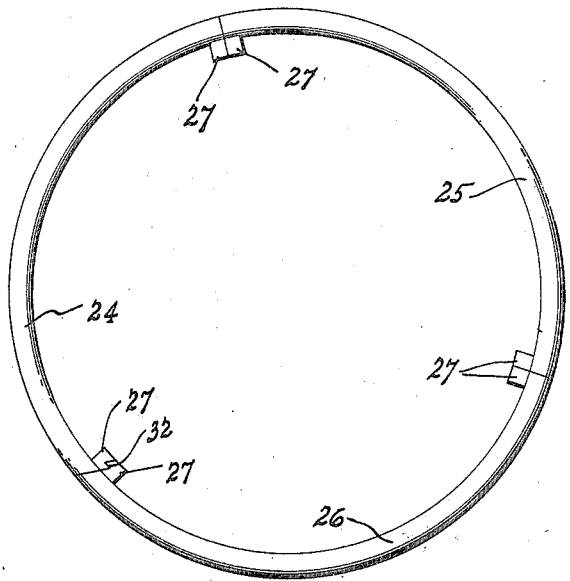
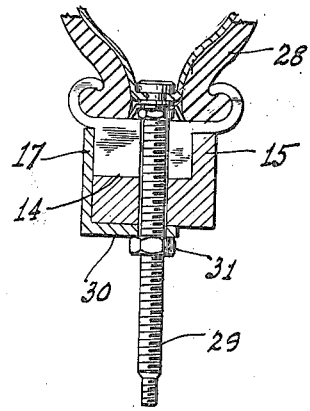
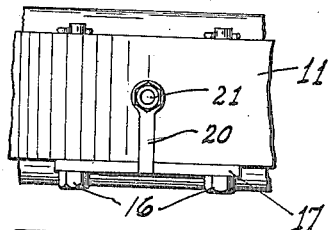
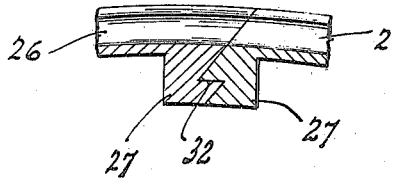
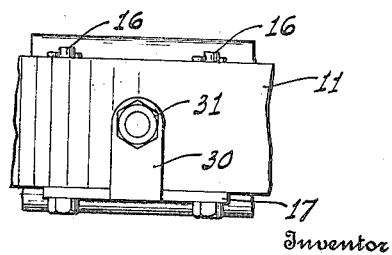
Inventor
Jesse A. Hocker
By Watson E. Coleman, Attorney Patented Oct. 10, 1922.

1,431,660

UNITED STATES PATENT OFFICE.

JESSE A. HOCKER, OF DURANGO, COLORADO.

AUTOMOBILE WHEEL.

Application filed August 10, 1921. Serial No. 491,181.

*To all whom it may concern:*

Be it known that I, JESSE A. HOCKER, a citizen of the United States, residing at Durango, in the county of La Plata and State of Colorado, have invented certain new and useful Improvements in Automobile Wheels, of which the following is a specification, reference being had to the accompanying drawings.

This invention relates to wheels for vehicles, and particularly to quick demountable rims for automobile wheels.

The general object of this invention is to provide means whereby a rim may be very quickly put in place upon the felly of an automobile wheel, held firmly in place thereon, or as quickly removed.

A further object is to provide a construction of this character in which the tire of the wheel is carried upon a sectional rim, the wheel being so constructed that when the tire and rim are placed upon the wheel the rim may be locked on the wheel against movement.

And a further object is to so construct the rim that slipping or creeping of the tire will be prevented.

A still further object is to so construct the sectional rim that it will always remain as firm and substantial as a one-piece rim when in place, the sectional rim permitting the tire casings to be easily placed upon the rim without the necessity of stretching the casing over the rim.

Other objects will appear in the course of the following description.

My invention is illustrated in the accompanying drawings, wherein:—

Figure 1 is a side elevation of an automobile wheel provided with my improved demountable rim;

Figure 2 is a sectional view on the line 2—2 of Figure 1;

Figure 3 is a sectional view on the line 3—3 of Figure 1;

Figure 4 is an enlarged side elevation of the rim tire of the wheel showing the locking plate displaced from its normal position;

Figure 5 is a side elevation of the rim showing the several sections;

Figure 6 is a section on the line 6—6 of Figure 1;

Figure 7 is a fragmentary under side plan view of the felly showing the locking device thereon;

Figure 8 is an enlarged longitudinal sectional view through abutting lugs 27 of the rim;

Figure 9 is an under side plan view of the construction shown in Figure 6.

Referring to these drawings, 10 designates an automobile wheel of any suitable construction and having a felly 11, a hub 12, and the spokes 13. The felly 11 is formed at a plurality of points, as for instance three points, with recesses 14 extending inward from the outer face of the felly but terminating short of the inner face so that a wall 15 is provided whose inner face forms the end of the recess. These recesses may be approximately $\frac{5}{8}''$ deep and $3''$ long and are preferably disposed equi-distantly around the wheel. A pair of bolts 16 pass transversely through the felly at each end of each recess 14 and carried upon these bolts is a steel plate 17 which adjacent its ends is formed with transversely elongated slots 18. The inner edge of this plate 17 is formed with a notch 19. Pivotally mounted upon the inner face of the rim, that is the face of the rim confronting the hub and opposite the middle portion of each recess 14, is a thumb latch 20. This thumb latch is mounted upon a bolt or screw 21 and extending into the felly and between the head of the screw or bolt 21 and the latch 20 there is disposed a coiled compression spring 22 so that the latch is urged toward the face of the felly. The screws 16 are preferably held in place at their extremities by cotter pins 23 so as to prevent any detachment of the screws. Any other suitable locking means may be used, however, for this purpose.

The tire rim is composed of three sections 24, 25, and 26, which sections are approximately alike, and each section is formed at its ends with centrally projecting lugs 27 so that the rim is split at three points, each division or split extending between adjacent lugs 27. The three pairs of lugs slightly differ from each other, as will be hereafter explained, but these three pairs of lugs are adapted to seat within the three recesses 14 after the tire 28 has been disposed upon the rim sections and after these pairs of lugs 27 have been set within the recess 14. The plates 17 are shifted outward and latched in their outwardly shifted position by means of the latches 20, the extremities of which engage in the notches 19 in the several plates. Thus the plates are held outward by the latches, which in turn are forced outward by means of the springs 22.

If it be desired to release the rim, it is only necessary to retract the latches 20 from engagement with the notches 19, whereupon the plates 17 may be moved inward to uncover the front of the recesses 14, permitting the rim formed of the sections 24, 25 and 26 to be slipped laterally off the wheel. When slipped off the wheel, the sections may be readily disengaged from each other and removed from engagement with the tire 28. The sections may be as readily engaged with each other on the inside of the tire 28 and then slipped upon the felly of the wheel. By applying this rim to the tire 28, one section at a time, the necessity is avoided of stretching the tire casing over the rim and no other tools will be needed in changing tires except a small screw-driver or similar instrument to remove the thumb latches 20 from their engagement with the notches 19. One of the pairs of lugs, as for instance those pairs of lugs between the sections 24 and 25, will be apertured so that the valve tube 29 of the tire may pass through it. There would, therefore, be no latch 20 required at this point, but the plate 17 for this one particular pair of lugs would be formed with a small lug 30 at right angles to the plate which would extend across the inner face of the felly and across to the valve stem so that the valve stem nut 31 will engage this lug and hold the plate 17 in place, thus doing away with the use of the thumb latch at this particular part.

Where straight side tires are used, the dividing line between the sections 24 and 25 would be cut straight through between the lugs 27 but at one of the remaining joints the rim and the pair of lugs would not have a radial joint but the joint would be on an incline, as shown in Figure 8, the confronting faces of the pair of lugs being formed with coacting teeth 32, as illustrated in Figure 8, so as to permit of the slipping of the rim from the tire. The remaining lug would be cut radially. In fitting clincher tires to this rim a special tool would be needed in order to fit the tire to the rim.

It will be seen that this construction is very simple, that the rim in turn will be held firmly in place upon the felly of the wheel. I have illustrated the tire rim as being formed in three sections but do not wish to be limited to this, as it is obvious that it might be formed in more sections, the number of recesses in the felly of the wheel being, of course, increased to correspond.

While I have illustrated details of construction which I believe to be particularly valuable in practice, I do not wish to be limited to these, as it is obvious that the invention might be embodied in other forms without departing from the principle thereof as defined in the appended claims.

I claim:—

1. A wheel having a plurality of recesses in its felly, a rim coacting with the wheel and having a plurality of radially projecting lugs adapted to be received in said recesses when the rim is in place upon the felly, guard plates mounted upon the felly adjacent each recess and shiftable into a position closing the recess or out of said position, each of said plates being formed at its middle with a notch, and latches mounted on the inner face of the felly and shiftable into position engaging said notches or out of such position.

2. A wheel having a felly formed with a plurality of recesses extending inward from the periphery of the felly and inward from the outside face of the felly and terminating short of the inside face of the felly, guards mounted upon the outside face of the felly and shiftable into or out of position to close the outer ends of said recesses, and a tire rim having inwardly projecting lugs adapted to be received within said recesses, one of said lugs being apertured for the passage of the valve stem of a tire and the corresponding guard having a lug adapted to engage around said valve stem.

3. A wheel having a felly formed with a plurality of recesses on its periphery, the recesses extending inward from the outer face of the felly and terminating short of the inner face of the felly, bolts extending outward on each side of the recesses, a guard plate, one for each recess, disposed against the outer face of the felly and having elongated apertures through which said bolts pass, said apertures permitting each plate to shift radially toward or from the hub of the wheel, latches holding said guard plates in their projected positions covering the ends of said recesses, and a tire rim having inwardly projecting lugs insertible within said recesses.

In testimony whereof I hereunto affix my signature.

JESSE A. HOCKER.